United States Patent [19]

Thomas et al.

[11] Patent Number: 4,748,311

[45] Date of Patent: May 31, 1988

[54] INVERTER WITH POWER SUPPLY TO CHOPPER THROUGH PARALLEL RESONANT CIRCUIT TUNED TO TWICE THE CHOPPER FREQUENCY

[75] Inventors: Friedrich-Werner Thomas, Gelnhausen; Johann Stürmer, Freigericht, both of Fed. Rep. of Germany

[73] Assignee: Leybold Aktiengesellschaft, Fed. Rep. of Germany

[21] Appl. No.: 19,694

[22] Filed: Feb. 27, 1987

[30] Foreign Application Priority Data

Feb. 28, 1987 [DE] Fed. Rep. of Germany ....... 3606462

[51] Int. Cl.⁴ .................. H01J 37/315; H02M 7/519; H02M 7/538
[52] U.S. Cl. ................ 219/121 EA; 363/24; 363/37; 363/40; 363/134; 363/139
[58] Field of Search ............. 363/16, 17, 24–26, 363/37, 40, 134, 27, 28, 139; 219/121 EA; 250/427

[56] References Cited

U.S. PATENT DOCUMENTS

| 3,746,963 | 7/1973 | Ve Nard | 363/37 |
| 3,748,536 | 7/1973 | Andresen | 219/121 EA |
| 4,301,499 | 11/1981 | Levinson | 363/97 |
| 4,410,936 | 10/1983 | Suzuki | 363/21 |
| 4,679,129 | 7/1987 | Sakakibara | 363/40 |

Primary Examiner—William H. Beha, Jr.
Attorney, Agent, or Firm—Steele, Gould & Fried

[57] ABSTRACT

The invention relates to an inverter with a direct-voltage source and a chopper section, the chopper section having push-pull switching at a frequency $f_0$. A parallel tuned circuit, the resonant frequency of which is $2f_0$ is provided between the direct-voltage source and the chopper section.

11 Claims, 1 Drawing Sheet

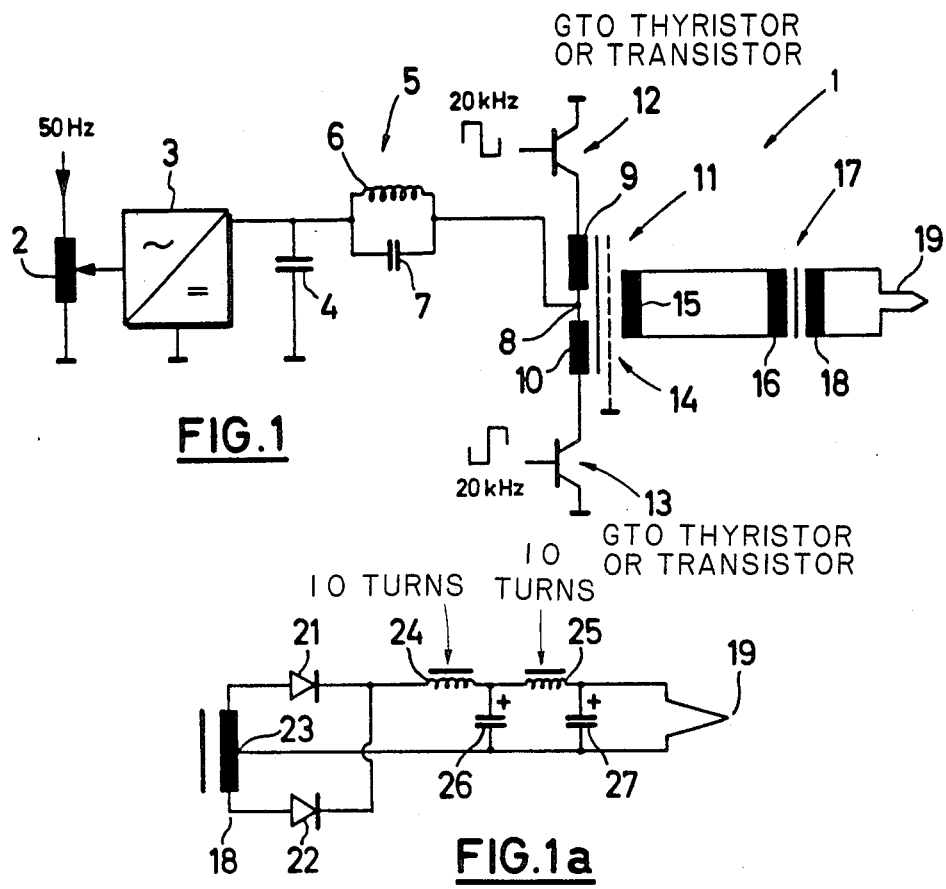
FIG.1
FIG.1a
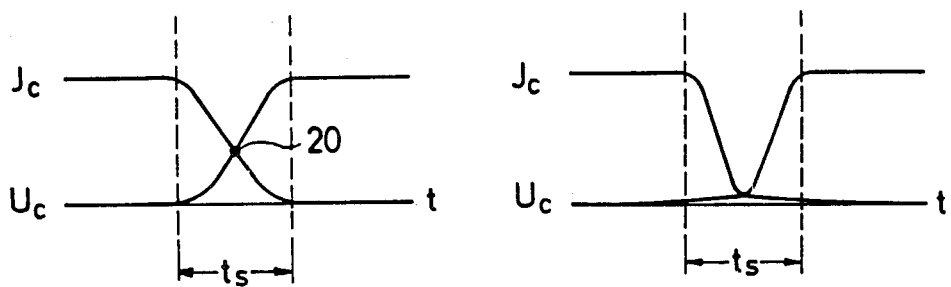
FIG.2      FIG.3

INVERTER WITH POWER SUPPLY TO CHOPPER THROUGH PARALLEL RESONANT CIRCUIT TUNED TO TWICE THE CHOPPER FREQUENCY

BACKGROUND OF THE INVENTION

1. Field of the Invention

The invention relates to an inverter comprising a direct-voltage source and a chopper section which has switching means which operate in push-pull and which are switched at the frequency $f_O$, a parallel tuned circuit being provided between the chopper section and the direct-voltage source.

2. Prior Art

In many fields of electrical engineering, it is necessary to obtain a direct current which is as smooth as possible for feeding a device from an alternating-current system. An example of this is the heating of the electron beam gun of an electronic welding machine. If this cathode is heated with a direct current with too much ripple, the electron beam cannot be accurately controlled.

It is known that the ripple of a direct current obtained from a 50-Hz alternating-current system can be reduced by filtering means, particularly by capacitors. It is also known to reduce the ripple by increasing the frequency. In this arrangement, the 50-Hz alternating-current system frequency is transformed, for example, into the kilohertz range.

As a rule, the frequency increase is effected by simple rectification of the system alternating voltage with subsequent high-frequency chopping of the rectified voltage. The smoothing effort required for obtaining an almost ideal direct voltage is much less if the frequency is increased. However, the power loss occurring at the switching means of the chopper during the switching process is relatively great and this has unfavorable effects particularly when high powers are to be switched.

In the above mentioned cathode heating supply, about 300 watts must be switched at a transformer having a large leakage inductance and the cathode, which is at $-60$ kV, must be supplied with direct current which is as smooth as possible.

Numerous inverters are already known which convert a direct current into alternating current by means of an electronic chopper (German patent specification No. 2,713,072, German Offenlegungsschrift No. 3,142,304). However, these inverters do not have a parallel tuned circuit between the chopper section and the direct-voltage source.

However, inverters are also known which contain a parallel tuned circuit (German patent specification No. 2,453,924, German Offenlegungsschrift No. 3,142,304, European patent EP-A 005083, Japanese patent journal: Patents Abstracts of Japan, E-204, Oct. 15, 1983, Vol. 7, No. 33, 58-123369 (A)).

However, the resonant frequencies of the respective parallel tuned circuits in these arrangements have a non-optimal relationship to the frequencies with which the switching means of the inverter are switched.

The invention is based on the object of significantly reducing the power loss of the switching means of the chopper section during the switching process in an inverter.

This object is achieved by the fact that the resonant frequency of the parallel tuned circuit is set to $2f_O$.

The advantage achieved by means of the invention consists, in particular, in the fact that the switching means, which operate in push-pull, are always switched over when the voltage of oscillation of the parallel tuned circuit is zero. Since the power loss during the switching is defined by the product of current and voltage within this period of time, this greatly reduces the switching power loss.

BRIEF DESCRIPTION OF THE DRAWINGS

An illustrative embodiment of the invention is shown in the drawing and is described in greater detail in the text which follows.

FIG. 1 shows a circuit arrangement according to the invention;

FIG. 1a shows the circuit connected to the secondary side of the transformer;

FIG. 2 shows the characteristic of the collector circuit and of the collector current in a push-pull switching transistor in a circuit without the parallel tuned circuit according to the invention;

FIG. 3 shows the characteristic of the collector voltage and of the collector current in a push-pull switching transistor according to the invention which is inserted into a circuit having the parallel tuned circuit according to the invention.

DETAILED DESCRIPTION OF THE PREFERRED EMBODIMENTS

FIG. 1 shows an inverter 1 according to the invention which has at its input a system alternating voltage of 50 Hz which is picked up at a variable transformer 2. The alternating voltage picked up at the variable transformer 2 is fed to a rectifier 3 which, for example, is a full-wave rectifier and which is followed by a filtering or smoothing capacitor 4 of, for example, $10^4$ uF at 100 V. At the output of this rectifier 3, for example 70 V. d.c. are present at 4.5 A. This output is connected to a parallel tuned circuit 5 which has a coil 6 and a capacitor 7. The resonant frequency of this parallel tuned circuit is, for example, 40 kHz. The output of the parallel tuned circuit 5 is connected to the junction 8 of two primary windings 9, 10 of a balancing transformer 11. The series-connected windings 9, 10 are connected, with the ends not connected to the junction 8, to the collector of in each case a transistor 12 and 13, respectively. The emitters of these transistors are connected to ground and their bases are driven in push-pull with a 20-kHz square wave voltage. The switching means of the chopper section can be gate-turn-off (GTO) thyristors. The source used for generating the 20 kHz control signal are known as such and are therefore not represented. The secondary side of the transformer 11, which has a core 14, is formed by a winding 15 which is in parallel with the primary side 16 of an isolating transformer 17, the secondary side 18 of which is connected to a cathode heater 19. This cathode heater with 0.25 ohms is fed with about 50 A.

If the parallel tuned circuit is imagined not to be present in FIG. 1, the transistors act as normal choppers of the direct voltage coming from rectifier 3. Since, in the example, the chopping frequency has been assumed to be $f_O=20$ kHz, an alternating current of $f_O=20$ kHz flowing through the primary side of the transformer 11 is obtained. The transformer can be, for example, a ferrite transformer having 20 turns of the windings 9, 10, and 10 turns of the winding 15.

FIG. 1a shows the circuit on the secondary side 18 of the transformer 11 in detail. The upper and lower end of the secondary side 18 is connected in each case to the anode of a diode 21 and 22, respectively, the cathodes of these diodes 21, 22 being joined to each other. Between a center tap 23 on the secondary side 18 and the cathode heater 19, two LC filters 24, 26 and 25, 27, respectively, are also located in addition to the diode 21. These LC filters act as smoothing sections, the inductances 24, 25 having about 10 turns for each pot core.

In the normal chopper mode, a current and voltage characteristic as shown in FIG. 2 is obtained at the collector of the transistors 12, 13. If, for example, the transistor 12 is brought into the non-conducting state by an appropriate control pulse, the current $I_C$ gradually decreases until it reaches the value O. In contrast, the collector-emitter voltage $U_c$, coming from zero, increases until it has reached its maximum. The $U_c$ curve intersects the $I_c$ curve at point 20. The power loss occurring during the switching time $t_s$ is determined by the product of the respective instantaneous values of $I_c$ and $U_c$. The power loss is thus relatively large.

If the parallel tuned circuit 5 is connected between the rectifier 3 and the junction 8 of the balancing transformer 11, the characteristic shown in FIG. 3 is obtained for $U_c$ and $I_c$. The direct voltage first obtained across coil 6 is chopped at a rate of 20 kHz by the chopper 9, 10, 12, 13. This causes the parallel tuned circuit 5 to be excited into oscillation at its natural frequency of 40 kHz. As a result, a sinusoidal voltage of oscillation of 40 kHz is present at point 8. This voltage of oscillation is O whenever the switching transistors 12, 13 are switched over. Since the voltage present at point 8 is an impressed voltage, another component which permanently provides a 40 kHz voltage could also be used in principal, instead of a parallel tuned circuit 5.

As can be seen from the characteristic of the curve shown in FIG. 3, during the switching time $t_s$ either $I_c$ is virtually zero when $U_c$ has a positive value, or $U_c$ is virtually zero when $I_c$ has a positive value. The power loss is thus negligibly small during the entire switching time $t_s$.

What is claimed is:

1. An inverter comprising: a direct-voltage source (3) and a chopper section (9, 10, 12, 13) which has switching means (12, 13) which operate in push-pull and which are switched at a frequency $f_O$, a parallel tuned circuit (5) being provided between the chopper section (9, 10, 12, 13) and the direct-voltage source (3), wherein the parallel tuned circuit (5) has a resonant frequency set to $2f_O$.

2. The inverter of claim 1, wherein the switching means (12, 13) operating in push-pull are connected to a primary side (8, 9) of a transformer (11) and the parallel tuned circuit (5) is connected to a center tap (8) on said primary side (8, 9).

3. The inverter of claim 1, wherein the direct-voltage source (3,4) has a rectifier (3) which is connected to an alternating-voltage source (2).

4. The inverter of claim 1, wherein the switching means of the chopper section has transistors (12, 13) which are connected to a primary side of a transformer (11).

5. The inverter of claims 2 or 4, wherein a secondary side (15) of the transformer (11) is connected to a primary side (16) of another transformer (17).

6. The inverter of claim 4, wherein a secondary side (18) of the transformer (17) is connected to a cathode heater (19) of an electron beam gun.

7. The inverter of claim 1, wherein the switching means of the chopper section are GTO thyristors.

8. The inverter of claim 5, wherein a secondary side (18) of said another transformer (17) has a center tap (23) and at least one diode (21) and an LC filter (24, 26 25, 27) and the cathode heater (19) are located between the center tap (23) and one connection of the secondary side (18).

9. The inverter of claim 8, wherein a cathode of the diode (21) is connected to a cathode of another diode (20), an anode of which is connected to the other connection of the secondary side (18).

10. The inverter of claim 8, wherein the LC filters (24, 26, 25, 27) have inductances (24, 25) of about 10 turns per pot core.

11. The inverter of claim 2, wherein switchable conduction paths of the switching means (12, 13) are connected in series with ends of respectively-associated halves (9, 10) of the primary winding of the transformer (11) which are opposite to the center tap (8).

* * * * *